(12) United States Patent
Gudat

(10) Patent No.: US 7,212,120 B2
(45) Date of Patent: May 1, 2007

(54) WORK SITE TRACKING SYSTEM AND METHOD

(75) Inventor: Adam J. Gudat, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 425 days.

(21) Appl. No.: 10/901,368

(22) Filed: Jul. 29, 2004

(65) Prior Publication Data

US 2005/0104736 A1    May 19, 2005

Related U.S. Application Data

(60) Provisional application No. 60/523,503, filed on Nov. 18, 2003.

(51) Int. Cl.
    *G08B 13/14*    (2006.01)
(52) U.S. Cl. .............................. 340/572.1; 340/825.49; 342/422; 343/834
(58) Field of Classification Search ............. 340/572.1, 340/572.2, 572.3, 572.4, 572.5, 572.6, 572.7, 340/572.8, 825.49, 825.77, 825.23; 342/74, 342/61, 148, 422, 359; 343/834, 761
    See application file for complete search history.

(56) References Cited

U.S. PATENT DOCUMENTS

| | | | | |
|---|---|---|---|---|
| 4,366,483 | A | * | 12/1982 | Hagedon et al. ............ 342/447 |
| 5,075,696 | A | * | 12/1991 | Wilby et al. ................ 342/432 |
| 5,192,955 | A | * | 3/1993 | Hoang ......................... 342/80 |
| 5,402,129 | A | * | 3/1995 | Gellner et al. ................ 342/70 |
| 6,270,433 | B1 | * | 8/2001 | Orenstein et al. ........... 473/467 |
| 6,614,721 | B2 | * | 9/2003 | Bokhour ..................... 367/128 |
| 6,995,705 | B2 | * | 2/2006 | Bradford et al. .............. 342/95 |

OTHER PUBLICATIONS

Ruff, Todd M., P.E. "Test Results of Systems to Monitor Blind Areas Behind Sanding Trucks," prepared for Washington State Department of Transportation, Jan. 25, 2001, pp. 1-6.
"Devices to Monitor Blind Spots Near Large Haulage Equipment," CDC NIOSH Technology News, U.S. Department of Health and Human Services, No. 484, Jan. 2001 (2 pages).
Ruff, Todd M. et al., "Mine Eyes: Proximity Alert for Monster Trucks," GPS World, Jul. 2002, pp. 16-22.
"Recommendations for Testing Radar-Based Collision Warning Systems on Heavy Equipment," CDC Workplace Safety and Health, RI 9657 Report of Investigations, Department of Health and Human Services, May 2002 (23 pages).
Ruff, Todd M., P.E., "Monitoring Blind Spots: A Major Concern for Haul Trucks," ww 18, Dec. 2001 (7 pages).
Ruff, Todd M., "Test Results of Collision Warning Systems on Off-Highway Dump Trucks: Phase 2," RI 9654 Report of Investigations, U.S. Department of Health and Human Services, Feb. 2001 (27 pages).
Ruff, Todd, M., "Test Results of Collision Warning Systems for Surface Mining Dump Trucks," NIOSH RI 9652 Report of Investigations, U.S. Department of Health and Human Services, May 2000 (50 pages).

* cited by examiner

*Primary Examiner*—Daniel Wu
*Assistant Examiner*—Daniel Previl
(74) *Attorney, Agent, or Firm*—Finnegan, Henderson, Farabow, Garrett & Dunner

(57) ABSTRACT

A system for tracking entities at a work site includes an antenna having a scanned boresight. A controller may be configured to determine a relative angle between a reference associated with the antenna and a source of radiation based on a relationship between boresight orientation and relative power values of a signal received by the antenna from the source of radiation for two or more boresight orientations of the antenna.

37 Claims, 7 Drawing Sheets

WORK SITE TRACKING SYSTEM AND METHOD

This application claims the benefit of U.S. Provisional Application No. 60/523,503, filed Nov. 18, 2003, which is incorporated herein by reference.

TECHNICAL FIELD

The present disclosure relates to the field of work site management systems and methods, and more particularly, to systems and methods for tracking entities at a work site.

BACKGROUND

Workers at work sites, including construction and/or mining sites, may experience dangers from several elements. For example, these sites typically include heavy machinery and equipment, such as bulldozers, cranes, front wheel loaders, soil stabilizers, rippers, and pulverizers. Operators of such heavy machinery and equipment often have a limited field of vision and may not readily detect the presence of other entities (e.g., workers, structures, and/or other machines) at the work site. The lack of knowledge regarding the presence and location of workers and other machines at the work site can lead to accidental collisions. Thus, there is a need for a system of locating and tracking the positions of workers, machines, hazardous sites, infrastructure elements, and other work site obstacles and displaying the positions of these obstacles to the machine operators.

Various systems have been proposed for tracking obstacles at work sites. U.S. Pat. No. 6,614,721 to Bokohour ("the '721 patent") describes one example of a collision avoidance system including a reader device attached to a vehicle. The reader device periodically transmits an ultrasonic pulse. If within range of the ultrasonic pulse, a tag device, worn by a worker or positioned on a machine or obstacle, receives the ultrasonic pulse and transmits a radio frequency (RF) signal to an RF receiver associated with the reader device.

A distance between the vehicle and the worker or obstacle in the '721 patent may be determined by monitoring the elapsed time between the transmission of the ultrasonic pulse and the reception of the corresponding RF signal. While the system of the '721 patent may potentially enable tracking of entities within a certain envelope of operation, the system may suffer from several shortcomings. For example, discerning an exact position (e.g., azimuth and distance) of the tracked entity with respect to the reader may be difficult or impossible. Further, the ultrasonic waves used to monitor the distance to a tracked entity may be vulnerable to interference. The system may also be ineffective at operating in all conditions that may be present at a work site.

The present disclosure addresses one or more of the deficiencies in the prior art.

SUMMARY OF THE INVENTION

One aspect of the disclosure includes a tracking system. The tracking system may include an antenna having a scanned boresight. A controller may be configured to determine a relative angle between a reference associated with the antenna and a source of radiation based on a relationship between boresight orientation and relative power values of a signal received by the antenna from the source of radiation for two or more boresight orientations of the antenna.

In another aspect, a method of tracking a source of radiation includes scanning an antenna having a boresight over a range of orientations of the boresight. A signal from a source of radiation can be received in at least two boresight orientations, and a relative angle between a reference associated with the antenna and the source of a radiation may be determined based on a relationship between boresight orientation and relative power values of the received signal among the at least two boresight orientations.

Yet another aspect of the disclosure includes a work machine having a body. A first antenna, including a scanned boresight, may be attached to the body. At least one additional antenna, including a scanned boresight, may also be attached to the body and spaced apart from the first antenna. A controller may be included on the work machine, and the controller may be configured to determine a relative angle between a reference associated with the first antenna and a source of a radiation based on a relationship between boresight orientation and relative power values of a signal received by the first antenna from the source of radiation for two or more boresight orientations of the first antenna. The controller can also determine another relative angle between another reference associated with the at least one additional antenna and the source radiation based on a relationship between boresight orientation and relative power values of a signal received by the at least one additional antenna from the source of radiation for two or more boresight orientations of the at least one additional antenna. Additionally, the controller can determine a range value between the source of radiation and at least one of the antenna and the at least one additional antenna.

DETAILED DESCRIPTION

Figure 1:
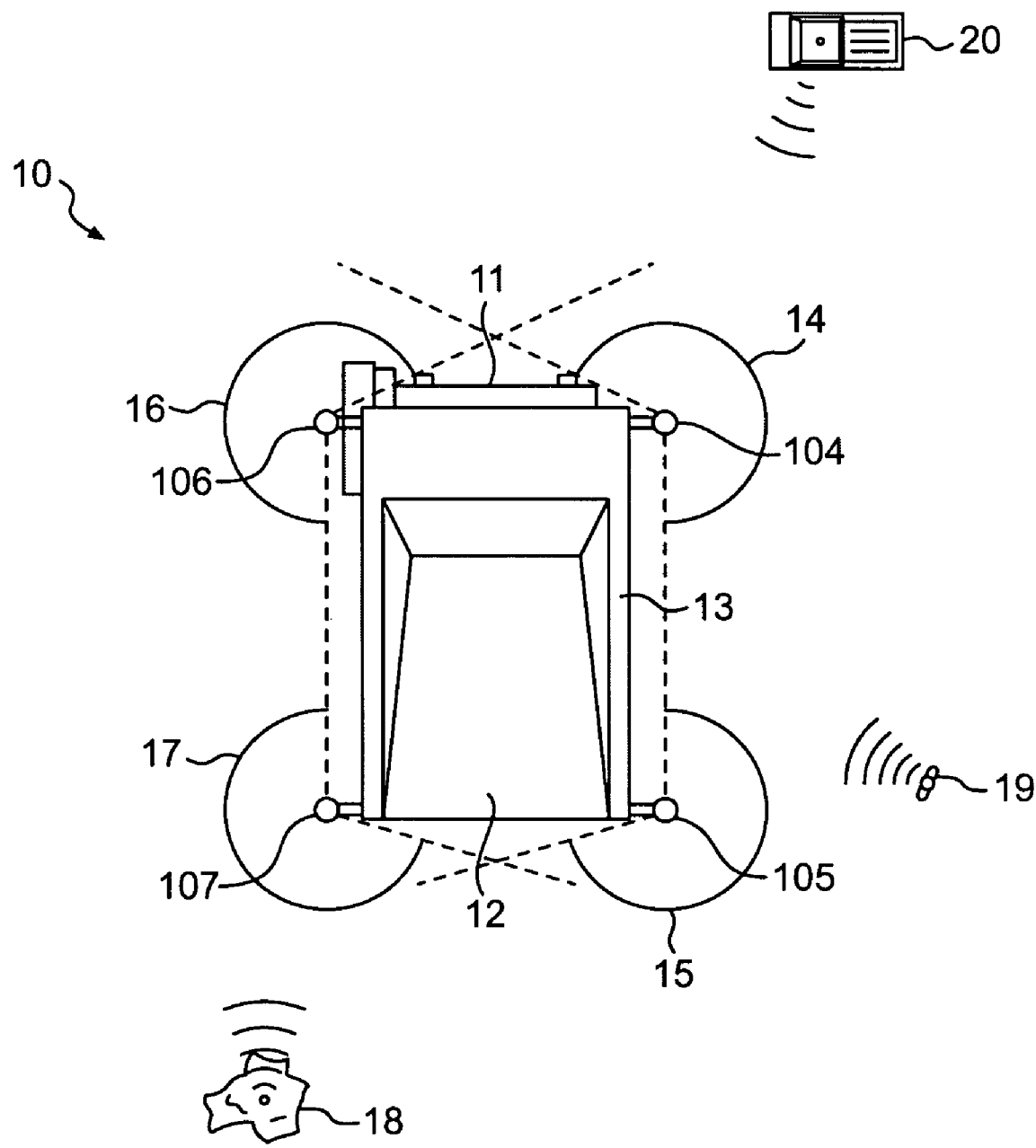
FIG. 1 is a schematic top-view representation of a work machine including an exemplary disclosed tracking system.

FIG. 1 provides a schematic top-view illustration of a work machine 10 according to an exemplary disclosed embodiment. Work machine 10 may include a truck, wheel loader, track-type tractor, wheeled tractor, vehicle, or any other type of machine known in the art. As used herein the terms "vehicle," "machine," and "equipment" are interchangeable, and by way of non-limiting examples, may refer to any equipment that may be used in any vehicular, construction, mining, work site, or other machine-related capacity.

As illustrated in FIG. 1, work machine 10 may include a dump truck having a front end 1 and a load carrying area 12. Work machine 10 may also include a body 13 onto which an array of tracking antennas may be mounted. These tracking antennas can be included as part of a tracking system, which will be discussed in more detail below. Work machine 10 may include a first antenna 104 and a second antenna 106 used for tracking the locations of various entities at a work site. Work machine 10 may also include a third antenna 105 and a fourth antenna 107. Each of antennas 104, 105, 106, and 107 may be located at or near a respective corner of work machine 10, as illustrated in FIG. 1.

The scanning antennas of work machine 10 may be arranged in various different configurations depending on a desired application. For example, antennas 105 and 107 may be omitted. Any or all of the antennas on work machine 10 may be located in any suitable position other than the corners of work machine 10. For example, one or more of the antennas may be located at a central location atop work machine 10. Additionally, work machine 10 may include a plurality of other tracking antennas (not shown) in addition to antennas 104, 105, 106, and 107. These additional antennas may also be placed at any desired location on work machine 10.

Each tracking antenna may include a range of angles over which a beam from the antenna is projected or scanned. This range of angles may also represent a detection window within which the antenna can receive a signal transmitted from a source of radiation located at some distance from the antenna. In the exemplary embodiment illustrated in FIG. 1, the ranges of angles over which beams from antennas 104, 105, 106, and 107 may be scanned are represented by azimuth scan areas 14, 15, 16, and 17, respectively. The shape of each azimuth scan area may be dictated, at least partially, by the locations of structures associated with work machine 10 and/or the mounting locations for the antennas. For example, a mounting location atop work machine 10 may be substantially free of line-of-sight obstructions and, therefore, may enable azimuth scan areas over a wide range of angles. Conversely, antenna locations on the sides of work machine 10 may provide for azimuth scan areas over only a limited range of angles. In this situation, a plurality of antennas may be positioned on work machine 10 such that their corresponding azimuth scanning areas overlap and provide a desired total tracking area around work machine 10 for tracking entities at a work site. Each of azimuth scan areas 14, 15, 16, and 17 may encompass a full 360 degree range or any range of angles less than 360 degrees.

Each scanning antenna on work machine 10 may be used to monitor signals transmitted by a tracked entity at a work site. In one embodiment, each entity at a work site designated for tracking may include a radio frequency (RF) transmitter (not shown). Entities for tracking may include geographical features, machines, tools, infrastructure, buildings, people, vehicles, and any other entity that an operator of work machine 10 may wish to avoid. As illustrated in FIG. 1, tracked entities may include a rock outcrop 18, a person 19, and/or a vehicle 20. The RF transmitter may be worn by person 19 or may be attached to rock outcrop 18 or vehicle 20. This transmitter may be a passive device that emits an RF signal when interrogated by a scanning signal (e.g., a scanning beam from any one of tracking antennas 104, 105, 106, or 107). The transmitter may also include an active device that emits an RF signal when in a "powered-on" state regardless of the presence of a scanning signal. In one embodiment, the transmitter may be included on a radio frequency identification (RFID) tag that can absorb energy from a scanning signal and re-transmit that energy as a transmitted RF signal. Other types of RFID tags and/or transmitters may be appropriate depending the requirements of a particular application.

In one embodiment, active tags may be associated with moving objects. Because certain active tags may have a shorter response time as compared to passive tags, the active tags may be more useful than passive tags for tracking objects that move (e.g., other machines, people, vehicles, etc.). Also, active tag devices may have a longer range than certain passive tag devices, which can also aid in tracking moving objects. Tracking moving entities is not limited to the use of active tags, however. Rather, depending on the requirements of a particular application, either active tags or passive tags may be used to track both moving and stationary entities.

Figure 2:
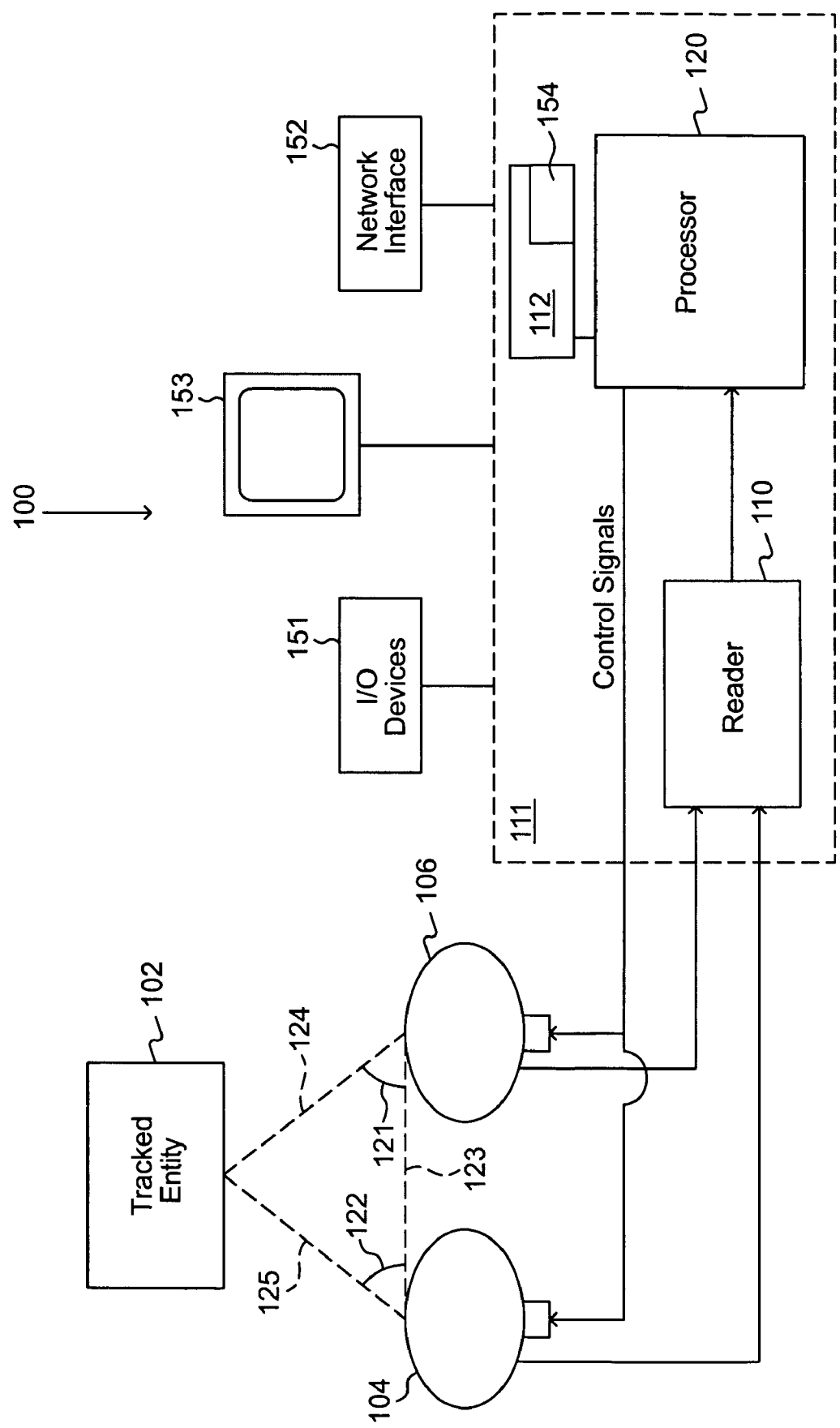
FIG. 2 is a block diagram representation of an exemplary disclosed tracking system.

Using the RF signal emitted by a transmitter associated with a tracked entity 102 (e.g., rock outcrop 18, person 19, and/or vehicle 20, among others), a tracking system 100, as shown in FIG. 2, can determine the position of the tracked entity relative to one or more of the scanning antennas 104, 105, 106, and 107 (or to any other point on work machine 10 by applying an appropriate translation operation with respect to a known antenna location). Particularly, based on a signal received by a first scanning antenna, tracking system 100 can determine a relative angle between a reference (e.g., a particular angle within the scan area of the antenna designated as a reference angle) associated with the first scanning antenna and the tracked entity. A second scanning antenna may also receive a signal from the same tracked entity, and tracking system 100 may determine a relative angle between the tracked entity and a reference associated with the second scanning antenna. By determining relative angles between each of the scanning antennas and the tracked entity, and by knowing a distance between the first and second scanning antennas, tracking system 100 may determine a range value representative of an azimuth and distance between the tracked entity and either of the scanning antennas or any other point on work machine 10.

As illustrated in FIG. 2, tracking system 100 may include at least two scanning antennas 104 and 106 and a controller 111. Tracking system 100 may include various input/output devices 151, a network interface 152, and a display 153. Controller 111 may be associated with or include a variety of components such as, for example, a reader 110, a memory 112, and a processor 120. Controller 111 may include any additional components known in the art for receiving data, running applications, and/or issuing control signals. It is contemplated that controller 111 may be located on work machine 10 or at a site remote from work machine 10.

Memory 112 may include a control module 154, which may provide functionality associated with controller 111 and tracking system 100. Control module 154 may include a software module, a hardware circuit, or a combination of software modules and hardware circuits. Further, functionality associated with control module 154 may be distributed into sub-components.

Network interface 152 may enable communication between controller 111 and various control systems or communication links remotely located with respect to work machine 10. For example, network interface 152 may provide a wired or wireless link to a LAN, a WAN, the Internet, one or more portable computing devices, or any other suitable network or device for exchanging information with controller 111.

Display 153 may be located on work machine 10. In one embodiment, display 153 may provide a graphical representation of work machine 10 and/or an area surrounding work machine 10. The locations, sizes, shapes, and any another other suitable characteristics of various tracked entities located in the area surrounding work machine 10 may be displayed to an operator of work machine 10 on display 153. Display 153 may include an LCD, a CRT, or any other display known in the art.

Processor 120 may provide control signals to each of scanning antennas 104 and 106. These control signals may affect the scanning characteristics of the antennas. For example, processor 120 may control the rate a scanning beam traverses a scanning area, the shape of a scanning beam, the size and shape of a scanning area, the direction of a scanning beam, the strength of a scanning signal, or any other characteristic of the antennas and the associated scanning beams.

Reader 110 may be included in tracking system 100 for monitoring signals received by antennas 104 and 106. For example, reader 110 may help determine characteristics such as power levels and change in power levels of signals received by the antennas. Reader 110 may also recognize identification information contained within a signal received by antennas 104 and 106. For example, an signal transmitted by tracked entity 102 may include information detailing the type of entity to which the transmitter is attached (e.g., rock, infrastructure, person, vehicle, machine, etc.), an id tag, site name, entity name, or any other appropriate identification information. This information may be passed to processor 120 and/or stored in memory 112.

As noted above, tracking system 100 can determine relative angles between at least one tracked entity 102 and one or more of antennas 104 and 106. Particularly, using known characteristics of the scanning beam emitted from antenna 104, tracking system 100 can determine an angle 122 between a reference associated with antenna 104 (e.g., any selected reference plane having a known orientation with respect to antenna 104) and tracked entity 102. Similarly, tracking system 100 can determine an angle 121 between a reference associated with antenna 106 and tracked entity 102. Using angles 121 and 122, along with a known distance 123 between antenna 104 and antenna 106, a distance value 124 between antenna 106 and tracked entity 102 may be determined by triangulation. Also, a distance value 125 between antenna 104 and tracked entity 102 may be determined. From these known angles and distance values, a position of tracked entity 102 with respect to work machine 10 can be determined. This information may be conveyed to an operator of work machine 10 to aid in, for example, avoiding a collision with tracked entity 102.

Figure 3:
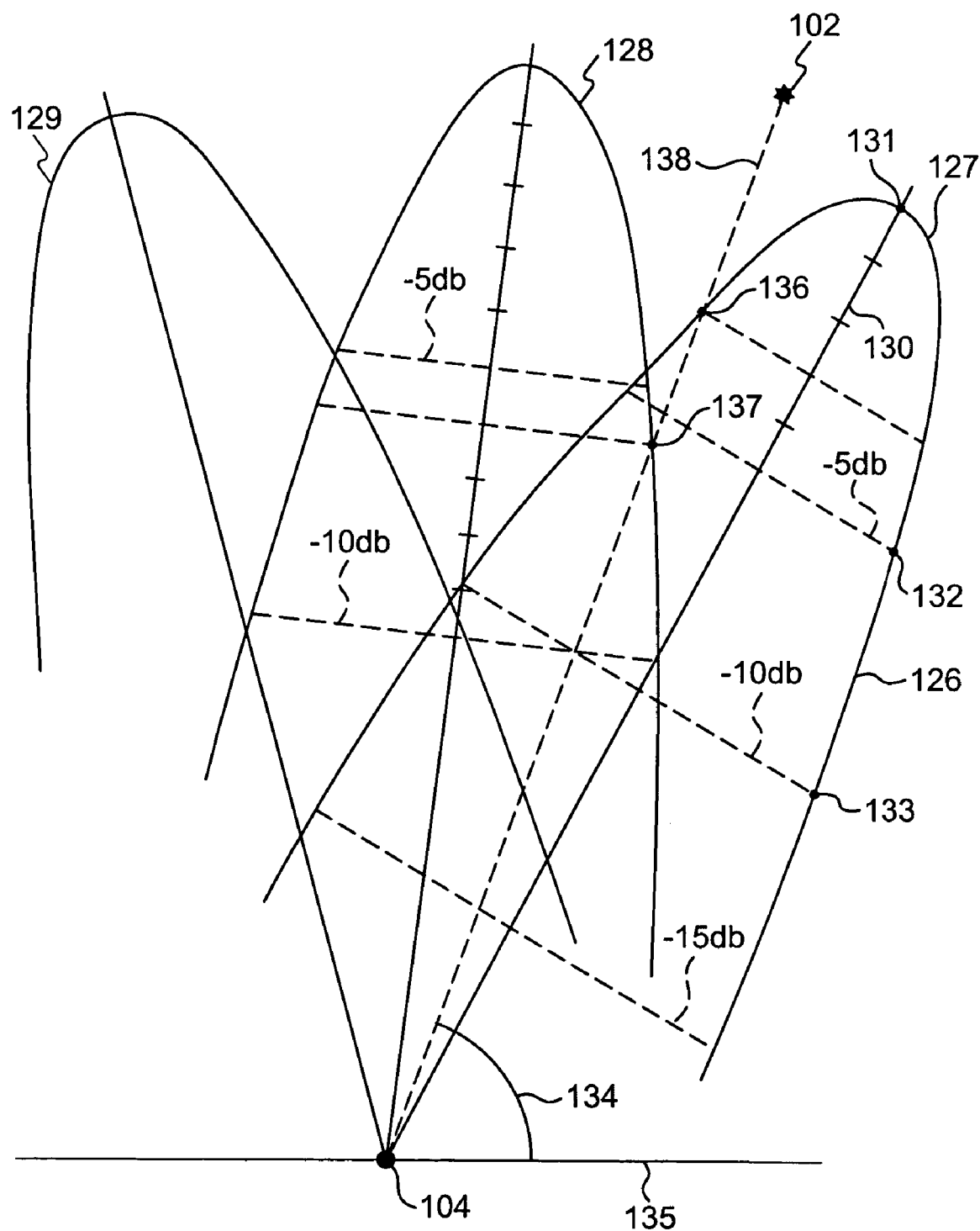
FIG. 3 is schematic illustration of beam patterns for an antenna included in an exemplary disclosed tracking system.

Referring to FIG. 3, the process for determining a relative angle between a reference associated with a scanning antenna and a tracked entity will now be described. FIG. 3 provides a schematic illustration of a beam pattern of a scanning antenna that may be included in tracking system 100. The scanning antennas included in tracking system 100 may include any type of antenna capable of generating a directional beam of radiation and scanning that beam over a range of angles.

In one embodiment, scanning antenna 104, for example, may include a phased array antenna. This type of antenna may include a plurality of antenna elements arranged in a ring configuration, for example. The direction of the beam emitted from the array may be controlled by selectively controlling which antenna elements are active at a particular time. A primary element may be activated such that a beam of radiation is emitted from the antenna along a boresight of the antenna (i.e., the center of the beam pattern of the antenna, which may correspond to the peak power level of the beam and, correspondingly, to the peak sensitivity of the antenna). Elements on either side of the primary element may be activated to adjust the shape of the beam emitted by the antenna. For example, by phase shifting the elements on either side of the primary element, the beam emitted from the antenna may be made narrower or wider to suit a desired application. It should be noted that multiple elements on either side of the primary element may also be used to control the shape of the emitted beam.

By controlling the elements of a phased array, scanning antenna 104 may emit a beam 126 having a shape as shown in FIG. 3. Adjusting the location of the active elements of the phased array may enable incremental scanning of beam 126. For example, by deactivating the elements that generated beam 126 at a beam position 127 and activating antenna elements located counterclockwise with respect to the original elements, beam 126 can be moved to a new beam location 128. By continuing this process, beam 126 can be moved to yet another beam location 129. This process may be repeated continuously over any desired range of scan angles.

The number and size of the elements in scanning antenna 104 can determine the size of the increments over which beam 126 may be scanned. For example, an sixteen-element phased array antenna may have a minimum scan angle increment value of 22.5 degrees. Scanning antenna 104, however, may include any number of elements more or less than sixteen to provide any desired scan increment angle. For example, by increasing the number of elements, the boresight of scanning antenna 104 may be scanned over angle increments of 1 degree or less.

The shape of beam 126, as shown in FIG. 3, represents the sensitivity pattern of antenna 104 to signals transmitted by, for example, tracked entity 102. Beam 126 includes a boresight 130, which corresponds to line along which antenna 104 exhibits its highest sensitivity at beam location 127. If a signal received by antenna 104 originates from a position angularly displaced from boresight 130, then the observed power for that signal will be lower than the observed power for the same signal had it originated from a position along boresight 130. For example, in beam position 127, a signal received along boresight 130 through point 131 will take advantage of the highest sensitivity of antenna 104 and will be observed with a peak power value. The same signal received by antenna along a line through point 132 will be observed with a reduced power level. Through point 132, the signal will be observed to have experienced a power level reduction of −5 db. Similarly, the same signal observed by antenna 104 along a line through point 133 will be observed to have experienced a power level reduction of −10 db.

With knowledge of the scanning characteristics of antenna 104 and the shape of beam 126, an angle 134 between tracked entity 102 and a reference line 135 associated with antenna 104 may be determined. Particularly, when beam 126 is in beam position 127, a signal emitted from tracked entity 102 may be detected by antenna 104. The signal from tracked entity 102 will be observed by antenna 104 along a line through point 136. Controller 111 may monitor and record a first power level value associated with the received signal from tracked entity 102 at beam location 127. Once beam 126 has moved to beam position 128, the signal transmitted by tracked entity 102 may again be observed by antenna 104. At beam position 128, the signal from tracked entity 102 may be observed along a line through point 137. Controller 111 may monitor and record a second power level value associated with the received signal from tracked entity 102 at beam location 128.

Based on a difference in the first and second power levels (i.e., the power levels observed in beam position 127 and beam position 128, respectively), angle 134 may be determined. For example, as illustrated in FIG. 3, the signal from tracked entity 102, received along a line through point 136, has a power level reduced by about −3 db with respect to the power level that would have been observed if tracked entity 102 was located along boresight 130 of beam location 127. Similarly, at beam location 128, the signal from tracked entity 102 has a power level reduced by about −6 db with respect to the power level that would have been observed if tracked entity 102 was located along the boresight at beam position 128. Thus, between beam position 127 and beam position 128, there will be an observed drop in power level of −3 db (i.e., the difference between −6 db and −3 db) in the signal received from tracked entity 102.

Because the shape of beam 126 may be known, controller 111 may determine the angular positions of points 136 and 137 with respect to antenna 104. For example, in view of the relatively small −3 db drop in observed signal strength between beam positions 127 and 128, and knowing the direction in which the scanning beam is moved, controller 111 may determine that point 136 is located on the left side of boresight 130 at beam position 127. For example, if point 136 had been located on the right side of boresight 130, then moving beam 126 to beam position 128 would have resulted in more than a −3 db drop in signal strength (i.e., in this case, the controller would have expected a drop in signal strength of approximately −15 db). Controller may then determine which pair of points on beam shape 126, at locations 127 and 128, provide a −3 db difference in sensitivity when positioned on a line radiating outwardly from the location of antenna 104. For example, controller 111 may refer to beam shape information stored in a lookup table or other appropriate data structure in memory 112. In this manner, controller 111 may determine the angular position of line 138 through points 136 and 137 with respect to reference line 135. This angular position may correspond to angle 134.

Figure 4:
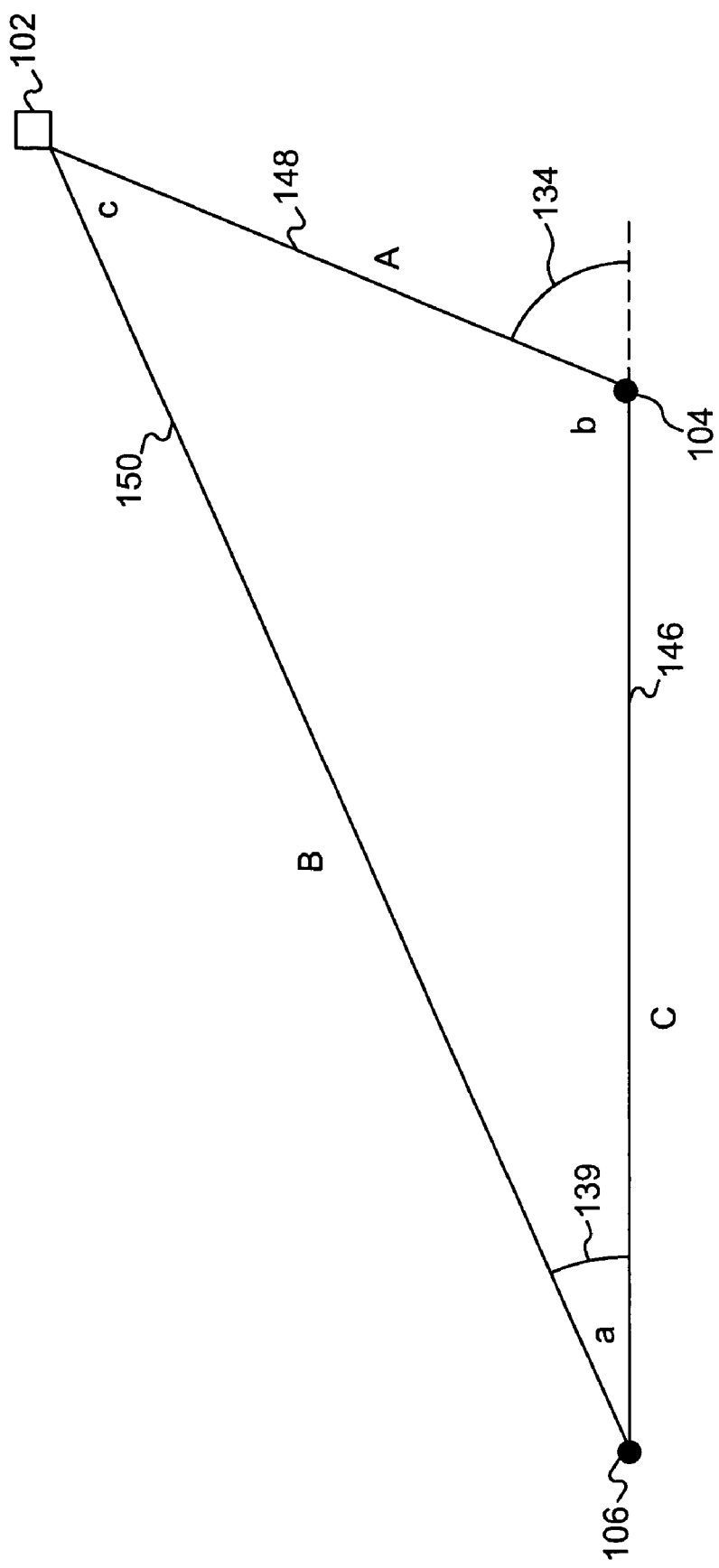
FIG. 4 is a schematic diagram illustrating an exemplary method of determining range of an entity at a work site, consistent with systems and methods of the present disclosure.

If this process for determining an angular position of tracked entity 102 with respect to an antenna is repeated for another antenna (e.g., antenna 106), then a position of tracked entity 102, including range and azimuth information, may be determined with respect to work machine 10. For example, repeating this process for scanning antenna 106 may enable determination of angle 139, as shown in FIG. 4. Using the values of angles 134 and 139, along with a known distance 146 between antennas 104 and 106, either or both of a distance 148 between tracked entity 102 and antenna 104 or a distance 150 between tracked entity 102 and antenna 106 may be determined using the trigonometric relationships $$\frac{\sin c}{C} = \frac{\sin b}{B} = \frac{\sin a}{A}$$

to yield:

Distance 148=Distance 146×[sin(angle 139)/sin (angle 134−angle 139)]

and

Distance 150=Distance 146×[sin(180°−angle 134)/sin (angle 134−angle 139)]

In another embodiment, the ranging information, in the form of distance and azimuth between a source of radiation and work machine 10, may be determined without reliance upon knowledge of the scanning beam shape. For example, by increasing the number of elements in antenna 104, the scanning increment may be reduced. In certain antennas, the scan increment may be reduced below 5 degrees. In other embodiments, the scan increment may be reduced to 1 degree or less. With these fine scanning increments, the relative angle between antenna 104 and tracked entity 102 may be determined by monitoring the power level of the signal transmitted by tracked entity 102 and received by antenna 104. Particularly, as antenna 104 is scanned over a range of angles, the signal strength of the signal received from tracked entity 102 by antenna 104 may be observed to increase and decrease. The particular scanning angle of antenna 104 at which a maxima in the received power level is observed will correspond to the relative angle between tracked entity 102 and antenna 104 (i.e., azimuth information). By repeating this process for scanning antenna 106, a second relative angle between tracked entity 102 and antenna 106 may be determined. With these two relative angle values and a known distance between antenna 104 and antenna 106, a full set of range information (e.g., a distance to tracked entity 102 along with the determined relative azimuth values) can be determined by the trigonometric processes described above.

The angular position and ranging information between at least one of antennas 104 and 106 (or any other antenna or location on work machine 10) may enable controller 111 to define the position of tracked entity 102. This position information may then be conveyed to the operator of work machine 10.

For example, the position of tracked entity 102 relative to work machine 10 may be graphically represented on display 153 (FIG. 2). Other information relating to tracked entity 102 may also be shown on display 153. For example, controller 111 may interpret identification signals transmitted by an RFID tag associated with tracked entity 102, for example, and include this information on display 153. This identification information may include a unique ID for tracked entity 102 and may specify what type of entity is transmitting the signal. The transmitted signal may indicate that the tracked entity is a machine, a rock outcrop, a person, a vehicle, a structural facility, or any other type of tracked entity. The signal may even include specific model numbers for machines, specific names of people, sizes and shapes of the entities, etc. With this information, detailed graphical representations of the tracked entities, including relative sizes and shapes, may be provided to an operator of work machine 10. The information shown on display 153 may include alphanumeric characters, color codes, symbols, or any other appropriate display techniques.

Controller 111 may also be configured to monitor the position of tracked entity 102 relative to work machine 10 over time to determine a probability of a collision occurring between tracked entity 102 and work machine 10. For example, by continuously tracking and determining range and azimuth values (e.g., position information) of tracked entity 102 with respect to work machine 10, controller 111 may determine the heading and velocity of both tracked entity 102 and work machine 10. This information may be shown on display 153 in the form of a velocity vector associated with tracked entity 102. Further, if controller 111 determines that the present headings of tracked entity 102 and work machine 10 will result in a collision, a warning may be issued to an operator of work machine 10. This warning may be in the form of an audible warning, a visual warning (e.g., on display 153), or any other suitable type of warning.

Controller 111 may be configured to issue the warning if the collision is predicted to occur within some predetermined range of time. For example, an operator may wish to know of potential collisions that may occur within a short time period (e.g., 15 seconds or less), but may be less interested in collisions that are projected to occur at a substantially later time. Potential collisions predicted to occur at times greater than one minute, for example, may be of less interest to the operator of work machine 10 because there may be a greater likelihood that the headings of either work machine 10 or tracked entity 102 may change within that time for reasons not associated with collision avoidance.

Figure 5:
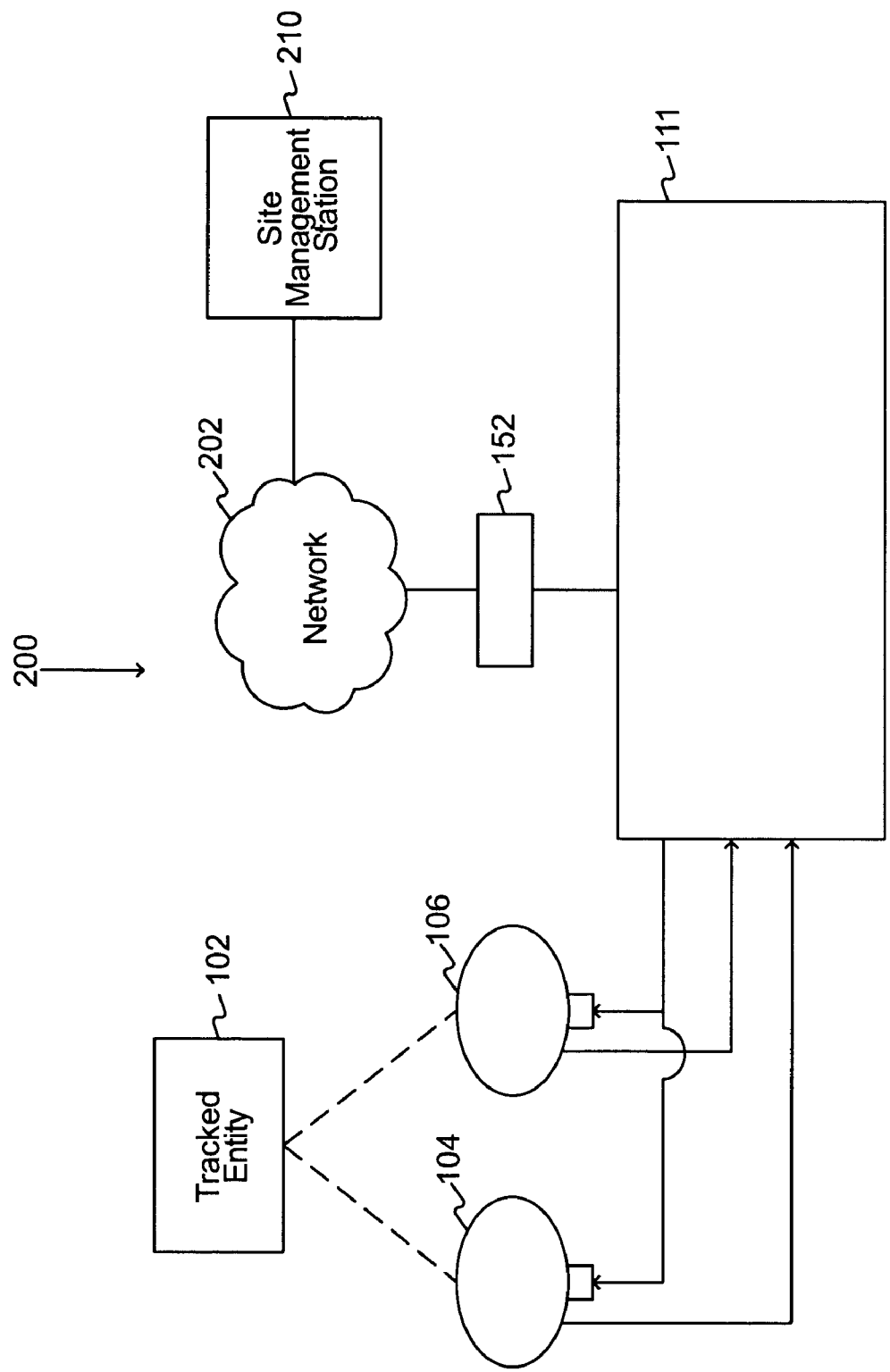
FIG. 5 is a block diagram illustrating another exemplary tracking system consistent with the present disclosure.

FIG. 5 provides a block diagram illustrating another exemplary tracking system 200 consistent with the present disclosure. In addition to components associated with tracking system 100 (FIG. 2), tracking system 200 may further include a network 2.02 connecting controller 111 (e.g., through network interface 152) to a site management station 210. Network 202 may include any suitable technology for enabling communications between controller 111 and site management station 210. Network 210 may included wired technology, wireless technology, or any combination thereof. Site management station 210 may both receive signals and transmit signals to the various components associated with systems and methods of the present disclosure. For example, site management station 210 may receive tracking signals (e.g., tracked entity positions and/or identification information) from controller 111. Site management station 210 may also be used to transmit signals to controller 111, which then may display any appropriate data (visual, audio, and/or audio/visual) to an operator of work machine 10 using appropriate audio/visual devices, such as I/O devices 151 or display 153 (FIG. 2).

Figure 6:
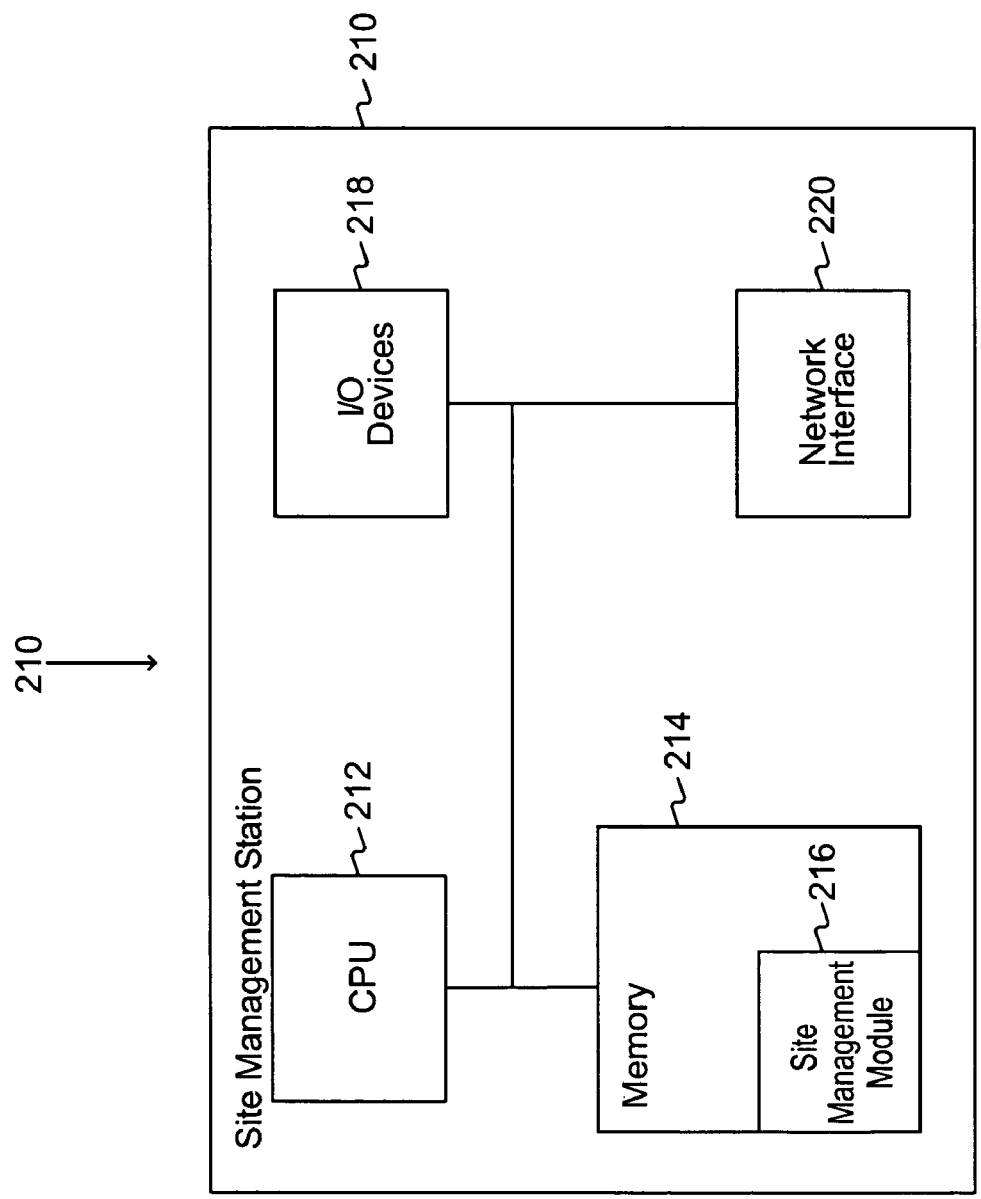
FIG. 6 is a block diagram illustrating an exemplary site management system, consistent with systems and methods of the present disclosure.

FIG. 6 is a block diagram illustrating an exemplary site management station 210, consistent with systems and methods of the present disclosure. Site management station 210 may comprise a CPU 212, a memory 214, I/O devices 218, and a network interface 220. CPU 212 may be a general purpose processor or a specialized processor. Memory 214 may further include a site management module 216. Site management module 216, when executed by CPU 212, may provide functionality associated with site management station 210. Site management module 216 may be a software module, a hardware circuit, or a combination of software modules and hardware circuits. Further, functionality associated with site management module 216 may be distributed into sub-components. I/O devices 218 may include a display, for example, which may be used to display a view of site to a site manager. For example, the site manager may be able to visually track and monitor any tracked entities at the work site.

Further, network interface 220 may enable site management station 210 to communicate with other off-site components, such as other control systems. One skilled in the art will appreciate that site management station 210 may have additional or fewer components. Further, both the site manager and the site management station 210 may be located off-site. Thus, for example, the site manager may manage several work sites simultaneously. Information from various work sites may be displayed at a common display or different displays. Further, site management station may be linked to a database or several databases (not shown). Such databases may include information concerning various entities at various sites in various tables, for example.

Figure 7:
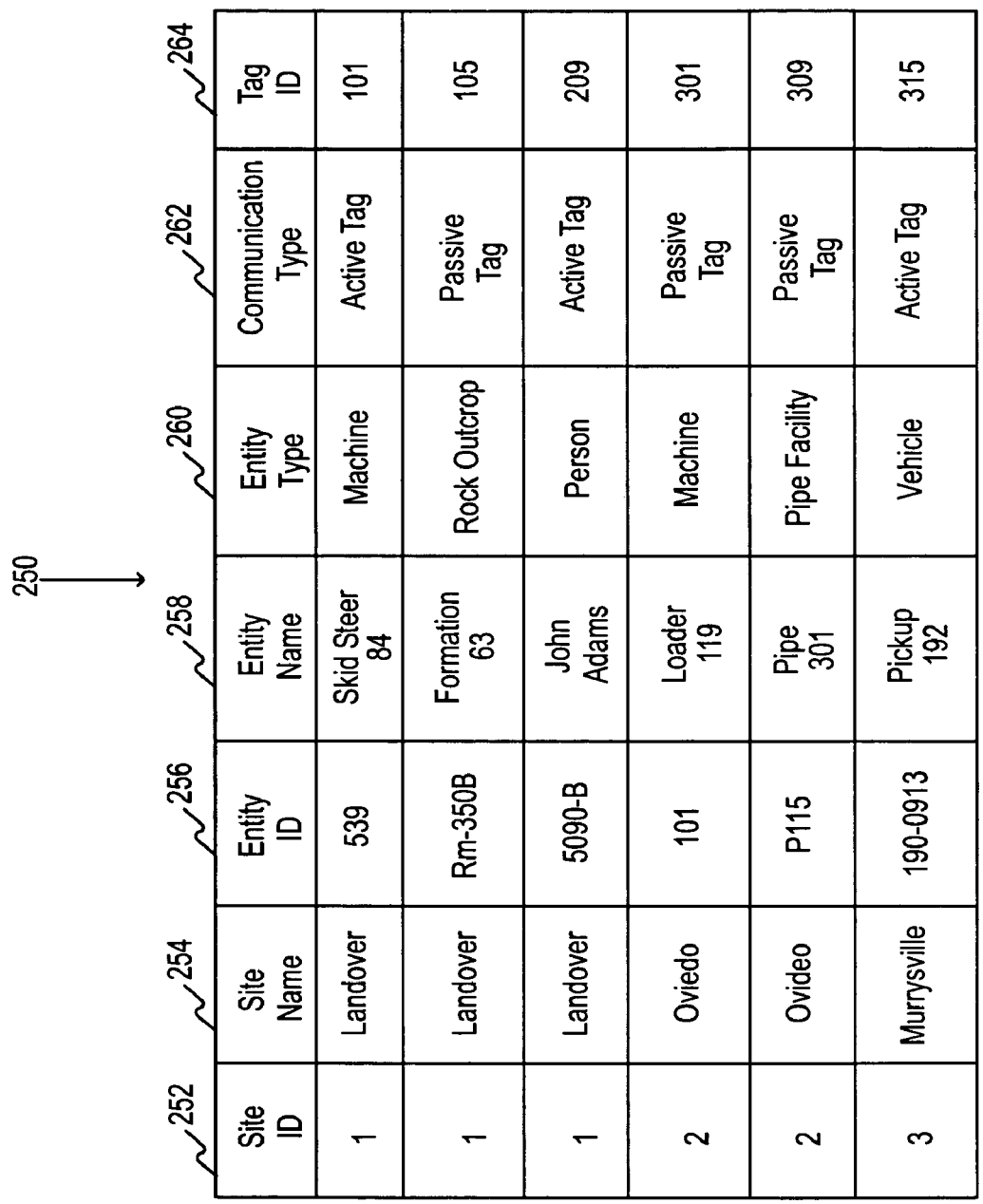
FIG. 7 is an exemplary entity tracking table, consistent with systems and methods of the present disclosure.

FIG. 7 is an exemplary entity tracking table 250, consistent with systems and methods of the present disclosure. Exemplary entity tracking table 250 may include information concerning various entities in various fields, such as a site ID 252, a site name 254, an entity ID 256, an entity name 258, an entity type 260, a communication type 262, and a tag ID 264. Site ID 252 may be a unique identification number identifying various sites. Site ID 252 may be a numeric string, an alphanumeric string, or any other type of identification mechanism. Site name 254 may relate to names of the different sites, for example. Entity ID 256 may be a unique identification number identifying various entities at a site, for example. Entity ID 256 and entity name 258 may be a numeric string, an alphanumeric string, or any other type of identification mechanism. Entity type 260 may indicate a type of the entity, such as whether the entity is a machine, a person, a vehicle, etc. Entity name 258 may include a specific name of a tracked entity unique to the tracked entity. Communication type 262 may indicate a type of communication method that a tag associated with a particular entity uses, for example. Thus, an entity may be identified as having an active or passive RFID tag, for example. Tag ID 264 may relate to a unique identification number for each tag (while Tag ID 264 is shown in FIG. 7 as an identification number having only three digits, any number of digits may be used to accommodate at least the total number of entities associated with an RFID tag and designated for tracking). Tag ID 264 may be a numeric string, an alphanumeric string, or any other identification mechanism. One skilled in the art will appreciate that table 250 is merely exemplary and it may contain fewer or additional fields. In addition, information stored in table 250 may be stored in different tables, databases, or other data structures.

INDUSTRIAL APPLICABILITY

The disclosed systems and methods for tracking entities may be used in any application where there is a need for monitoring the relative positions of objects. For example, the disclosed tracking systems may be employed at a work site, such as a construction or a mining site, to enable monitoring of relative positions between equipment, structures, vehicles, people, and any other type of entity at the work site. The disclosed systems may be helpful to entities at a work site in avoiding collisions with other entities at the work site.

The disclosed methods of tracking entities at a work site may provide a simple, reliable, and accurate solution to determining range information between entities at a work site. For example, using scanned beams from at least two phased array antennas to determine azimuth information between work machine 10 and one or more tracked entities 102, the range between work machine 10 and the one or more tracked entities 102 may be determined without reliance on the absolute power value of a signal transmitted by tracked entity 102. That is, rather than estimating the range between work machine 10 and tracked entity 102 using an absolute power value observed for the signal transmitted by tracked entity 102, the presently disclosed method may determine range information based only on a relative change in the observed power level of the transmitted signal at different orientations of the scanning beam.

It will be apparent to those skilled in the art that various modifications and variations can be made in the disclosed systems and methods for tracking entities without departing from the scope of the disclosure. Other embodiments of the disclosed systems and methods for tracking entities will be apparent to those skilled in the art from consideration of the specification and practice of the disclosure disclosed herein. It is intended that the specification and examples be considered as exemplary only, with a true scope of the disclosure being indicated by the following claims and their equivalents.

What is claimed is:

1. A tracking system, comprising:
   an antenna including a scanned boresight; and
   a controller configured to determine a relative angle between a reference associated with the antenna and a source of radiation based on a relationship between boresight orientation and relative power values of a signal received by the antenna from the source of radiation for two or more boresight orientations of the antenna.

2. The tracking system of claim 1, further including:
   at least one additional antenna including a scanned boresight;
   wherein the controller is further configured to determine another relative angle between another reference associated with the at least one additional antenna and the source radiation based on a relationship between boresight orientation and relative power values of a signal received from the source of radiation by the at least one additional antenna for two or more boresight orientations of the at least one additional antenna.

3. The tracking system of claim 2, wherein the controller is further configured to determine a range value between the source of radiation and at least one of the antenna and the at least one additional antenna.

4. The tracking system of claim 2, wherein the controller is further configured to monitor a change in location of the source of radiation with respect to at least one of the antenna and the at least one additional antenna and to issue a warning signal if the controller determines that a potential collision may occur between an entity associated with the source of radiation and an entity associated with at least one of the antenna and the at least one additional antenna.

5. The tracking system of claim 4, wherein the warning signal includes at least one of an audible sound and a graphical representation on a display.

6. The tracking system of claim 2, further including a display that graphically represents a position of the source of radiation with respect to at least one of the antenna and the at least one additional antenna.

7. The tracking system of claim 6, wherein the display graphically represents an entity associated with the source of radiation based on an identification signal received from the source of radiation.

8. The tracking system of claim 2, wherein the antenna and the at least one additional antenna are positioned on a work machine.

9. The tracking system of claim 2, wherein the at least one of the antenna and the at least one additional antenna include a phased array antenna.

10. The tracking system of claim 2, wherein the source of radiation absorbs energy from at least one of the antenna and the at least one additional antenna and transmits at least a portion of this energy in the form of an identification signal.

11. The tracking system of claim 1, wherein the controller is further configured to identify the source of radiation based on identification information transmitted by the source of radiation.

12. The tracking system of claim 1, wherein the source of radiation includes an RFID tag.

13. The tracking system of claim 1, wherein the source of radiation includes a passive RF transmitter.

14. A method of tracking a source of radiation, comprising:
   scanning an antenna having a boresight over a range of orientations of the boresight;
   receiving a signal from a source of radiation in at least two boresight orientations;
   determining a relative angle between a reference associated with the antenna and the source of a radiation based on a relationship between boresight orientation and relative power values of the received signal among the at least two boresight orientations.

15. The method of claim 14, further including:
   scanning at least one additional antenna having a boresight over a range of orientations of the boresight;
   receiving another signal from the source of radiation in at least two boresight orientations of the at least one additional antenna; and
   determining another relative angle between a reference associated with the at least one additional antenna and the source of a radiation based on a relationship between boresight orientation and relative power values of the another received signal among the at least two boresight orientations.

16. The method of claim 15, further including:
   determining a distance between the source of radiation and at least one of the antenna and the at least one additional antenna.

17. The method of claim 15, further including:
   displaying a position of the source of radiation with respect to at least one of the antenna and the at least one additional antenna.

18. The method of claim 15, further including:
   determining a likelihood of a collision occurring between an entity associated with the source of radiation and an entity associated with at least one of the antenna and the at least one additional antenna.

19. The method of claim 18, further including:
   issuing a warning signal if the collision is determined to occur within a certain predetermined time value.

20. The method of claim 14, further including:
   receiving identification information associated with the source of radiation.

21. The method of claim 14, further including:
   receiving information associated with the source of radiation and supplying the information to a network.

22. The method of claim 14, wherein the source of radiation includes an RFID tag.

23. A work machine comprising:
   a body;
   a first antenna, including a scanned boresight, attached to the body;
   at least one additional antenna, including a scanned boresight, attached to the body and spaced apart from the first antenna; and
   a controller, wherein the controller is configured to:
      determine a relative angle between a reference associated with the first antenna and a source of a radiation based on a relationship between boresight orientation and relative power values of a signal received by the first antenna from the source of radiation for two or more boresight orientations of the first antenna;
      determine another relative angle between another reference associated with the at least one additional antenna and the source radiation based on a relationship between boresight orientation and relative power values of a signal received by the at least one additional antenna from the source of radiation for two or more boresight orientations of the at least one additional antenna; and determine a range value between the source of radiation and at least one of the antenna and the at least one additional antenna.

24. The work machine of claim 23, wherein the controller is further configured to monitor a change in location of the source of radiation with respect to at least one of the antenna and the at least one additional antenna and to issue a warning signal if the controller determines that a potential collision may occur between an entity associated with the source of radiation and an entity associated with at least one of the antenna and the at least one additional antenna.

25. The work machine of claim 24, wherein the warning signal includes at least one of an audible sound and a graphical representation on a display.

26. The work machine of claim 23, further including a display that graphically represents a position of the source of radiation with respect to at least one of the antenna and the at least one additional antenna.

27. A tracking system, comprising:
at least two antennas each including a scanned boresight; and
means for determining relative angles between a source of radiation and the at least two antennas based on a relationship between boresight orientation and relative power values of signals received by the at least two antennas from the source of radiation for two or more boresight orientations of each of the at least two antennas.

28. The tracking system of claim 27, further including a means for determining a range of the source of radiation with respect to one or more of the at least two antennas.

29. The tracking system of claim 28, further including a means for displaying a position of the source of radiation with respect to an entity associated with the at least two antennas.

30. A tracking system comprising:
a first antenna including a scanned boresight;
at least one additional antenna including a scanned boresight, the at least one additional antenna being spaced apart from the first antenna;
a controller, wherein the controller is configured to:
determine a relative angle between a reference associated with the first antenna and a source of a radiation based on a relationship between boresight orientation and relative power values of a signal received by the first antenna from the source of radiation for two or more boresight orientations of the first antenna;
determine another relative angle between another reference associated with the at least one additional antenna and the source radiation based on a relationship between boresight orientation and relative power values of a signal received by the at least one additional antenna from the source of radiation for two or more boresight orientations of the at least one additional antenna; and
determine a range value between the source of radiation and at least one of the antenna and the at least one additional antenna; and
at least one management station in communication with the controller over a network.

31. The tracking system of claim 30, wherein the at least one management station is configured to maintain a database relating to tracked entities at a work site.

32. The tracking system of claim 30, wherein the controller is configured to send information relating to the source of radiation to the at least one management station over the network.

33. A method of tracking a source of radiation, comprising:
scanning a first antenna having a boresight over a first range of boresight angles;
receiving, with the first antenna, a signal transmitted by a source of radiation;
monitoring a power level of the signal received by the first antenna over the first range of boresight angles;
determining a first boresight angle within the first range of boresight angles that corresponds to a peak in the power level of the signal received by the first antenna;
scanning a second antenna having a boresight over a second range of boresight angles;
receiving, with the second antenna, the signal transmitted by the source of radiation;
monitoring a power level of the signal received by the second antenna over the second range of boresight angles;
determining a second boresight angle within the second range of boresight angles that corresponds to a peak in the power level of the signal received by the second antenna; and
determining a range value between the source of radiation and at least one of the first antenna and the second antenna.

34. The method of claim 33, further including:
displaying a position of the source of radiation with respect to at least one of the first antenna and the second antenna.

35. The method of claim 33, further including:
determining a likelihood of a collision occurring between an entity associated with the source of radiation and an entity associated with at least one of the first antenna and the second antenna.

36. The method of claim 33, further including:
receiving identification information associated with the source of radiation in the transmitted signal.

37. The method of claim 33, wherein the source of radiation includes an RFID teg.

* * * * *

UNITED STATES PATENT AND TRADEMARK OFFICE
CERTIFICATE OF CORRECTION

| | | |
|---|---|---|
| PATENT NO. | : 7,212,120 B2 | Page 1 of 1 |
| APPLICATION NO. | : 10/901368 | |
| DATED | : May 1, 2007 | |
| INVENTOR(S) | : Gudat | |

It is certified that error appears in the above-identified patent and that said Letters Patent is hereby corrected as shown below:

In Column 2, Line 66, after "end" delete "1" and insert -- 11 --, therefor.

In Column 9, Line 20, delete "2.02" and insert -- 202 --, therefor.

In Column 14, Line 54, in Claim 37, delete "teg" and insert -- tag --, therefor.

Signed and Sealed this

Twenty-second Day of July, 2008

JON W. DUDAS
*Director of the United States Patent and Trademark Office*